(12) United States Patent
Hallberg

(10) Patent No.: US 8,330,314 B2
(45) Date of Patent: Dec. 11, 2012

(54) MAGNETIC TRANSMISSION DEVICE

(76) Inventor: John Hallberg, Andover, MN (US)

( * ) Notice: Subject to any disclaimer, the term of this patent is extended or adjusted under 35 U.S.C. 154(b) by 367 days.

(21) Appl. No.: 12/652,344

(22) Filed: Jan. 5, 2010

(65) Prior Publication Data

US 2010/0171382 A1 Jul. 8, 2010

Related U.S. Application Data

(60) Provisional application No. 61/142,455, filed on Jan. 5, 2009.

(51) Int. Cl.
*H02K 49/10* (2006.01)
*H02K 7/02* (2006.01)
(52) U.S. Cl. .......................... 310/103; 310/114
(58) Field of Classification Search .......... 310/103–104, 310/112–114
See application file for complete search history.

(56) References Cited

U.S. PATENT DOCUMENTS

| | | | |
|---|---|---|---|
| 2,167,641 A | 10/1937 | Dewan | |
| 2,657,587 A | 4/1951 | Volk et al. | |
| 3,730,488 A * | 5/1973 | Gardner, Jr. | 366/262 |
| 4,115,040 A * | 9/1978 | Knorr | 417/420 |
| 5,013,949 A | 5/1991 | Mabe, Jr. | |
| 5,457,349 A | 10/1995 | Gifford | |
| 5,637,936 A | 6/1997 | Meador | |
| 6,954,019 B2 | 10/2005 | Sprain | |
| 7,112,904 B2 * | 9/2006 | Akiyama | 310/103 |
| 7,265,471 B2 | 9/2007 | Sprain | |
| 7,312,548 B2 * | 12/2007 | Wise | 310/103 |
| 7,336,011 B2 * | 2/2008 | Wise | 310/103 |
| 2002/0186647 A1 | 12/2002 | Her et al. | |
| 2005/0116567 A1 | 6/2005 | Limb | |
| 2006/0131887 A1 | 6/2006 | Gosvener | |
| 2008/0231124 A1 | 9/2008 | Elmaleh | |
| 2008/0238238 A1 | 10/2008 | Sprain | |

FOREIGN PATENT DOCUMENTS

WO WO 2005/064777 A1 7/2005

OTHER PUBLICATIONS

International Search Report from PCT/US2010/020100 mailed Mar. 11, 2010.
Simanek, Donald E. "Discussion of the Classic Magnetic Motor" [online, retrieved Dec. 6, 2008] <http://www.lhup.edu/~dsimanek/museum/cheng2.htm>.

* cited by examiner

*Primary Examiner* — Tran Nguyen
(74) *Attorney, Agent, or Firm* — IPLM Group, P.A.

(57) ABSTRACT

A magnetic device that includes a first wheel and a second wheel is provided. The first wheel has a first rotational axis and a plurality of first magnets. The second wheel is received at least in part within the first wheel. The second wheel has a second rotational axis that is generally perpendicular to the first rotational axis of the first wheel. The second magnetic wheel has a plurality of second magnets. The configuration of the plurality of first magnets and the plurality of second magnets creates magnetic fields that cause one of the first and second wheels to rotate when the other of the first and second wheels rotates.

17 Claims, 10 Drawing Sheets

MAGNETIC TRANSMISSION DEVICE

CROSS-REFERENCE TO RELATED APPLICATIONS

This application claims priority to U.S. Provisional Application Ser. No. 61/142,455 having the title "Magnetic Engine", filed on Jan. 5, 2009, which is incorporated in its entirety herein by reference.

BACKGROUND

An engine coupled to a transmission provides a rotational power output to the transmission. A typical transmission takes the power output from the engine and converts it to a transmission output that has a select rotational speed and torque that may be different than the power output (i.e. changing the gear ratio). Typical transmissions change their gear ratio with the use of mated gearing. For example, a typical vehicle with a manual transmission uses different sets of gears that are locked and unlocked to an output shaft with the use of a clutch and an automatic transmission uses a planetary gear set that is manipulated by hydraulic brake fluid. In each case, gears are engaged with each other to transfer rotational motion. The use of gears physically mated to transfer rotational motion results in a loss of energy. Moreover, the gears themselves are prone to wear because of the contact which can lead to a failure of the transmission.

For the reasons stated above and for other reasons stated below which will become apparent to those skilled in the art upon reading and understanding the present specification, there is a need in the art for an improved and efficient transmission system.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a magnetic device is provided. The magnetic device includes a first wheel and a second wheel. The first wheel has a first rotational axis and a plurality of first magnets. The second wheel is received at least in part within the first wheel. The second wheel has a second rotational axis that is generally perpendicular to the first rotational axis of the first wheel. The second magnetic wheel has a plurality of second magnets. The configuration of the plurality of first magnets and the plurality of second magnets creates magnetic fields that cause one of the first and second wheels to rotate when the other of the first and second wheels rotates.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a configuration of wheels with magnets that use the attractive and repulsive forces of magnetic fields produced by the magnets to provide an effective and efficient means to provide a rotational output. In embodiments, a second magnetic wheel (a wheel having magnets placed a select locations) is received in a first magnetic wheel. The wheels, in one embodiment are positioned such that a rotational axis of the first wheel is generally perpendicular to a rotational axis of the second wheel. In addition, the positioning of the poles of the magnets and the number of poles are selected to achieve a desired gear ratio so that the turning of one of the wheels results in the other wheel rotating a select number of times as further discussed below.

Figure 1A:
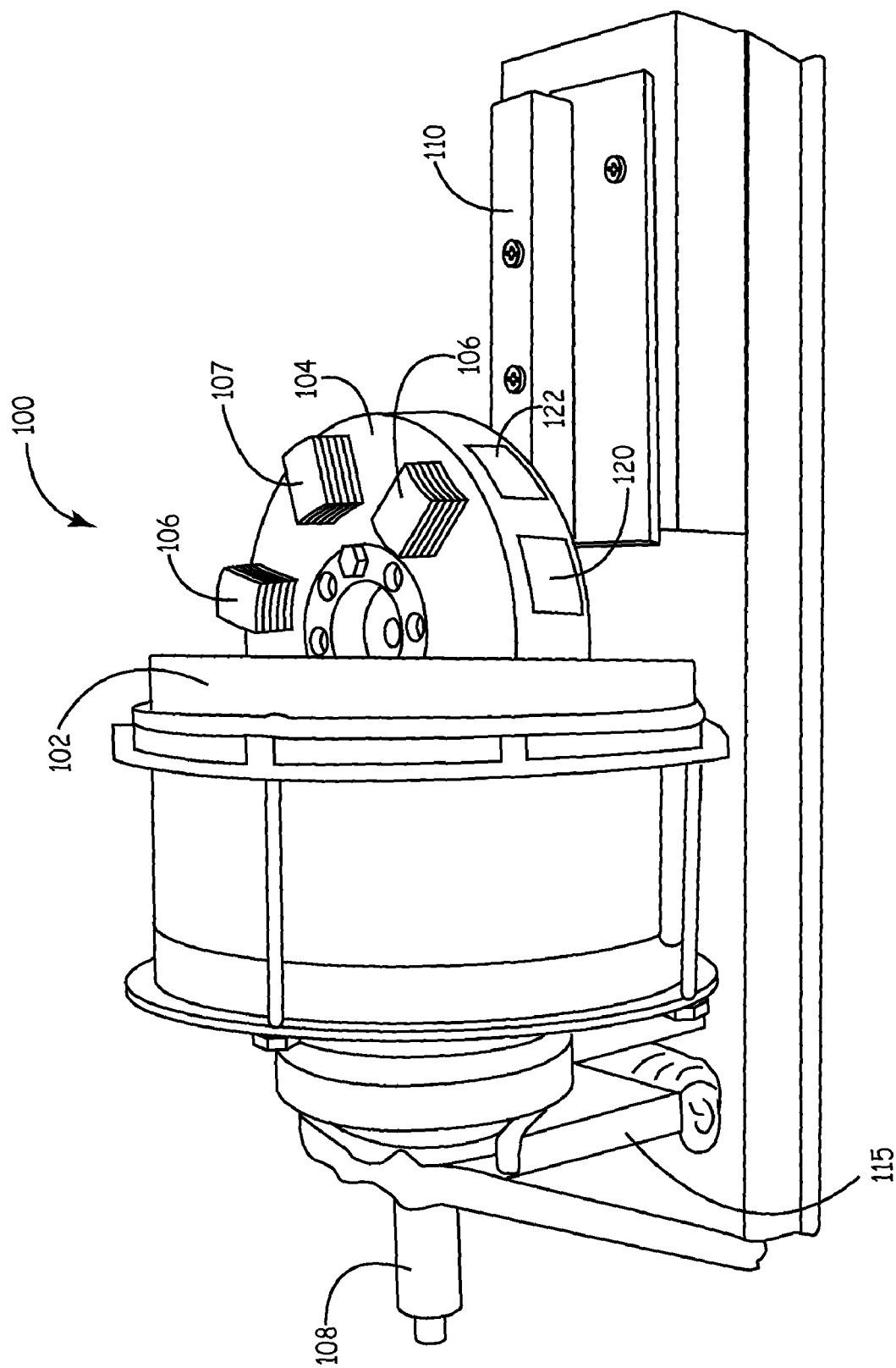
FIG. 1A is a side perspective view of a second wheel inside a first wheel device of one embodiment of the present invention.
Figure 1B:
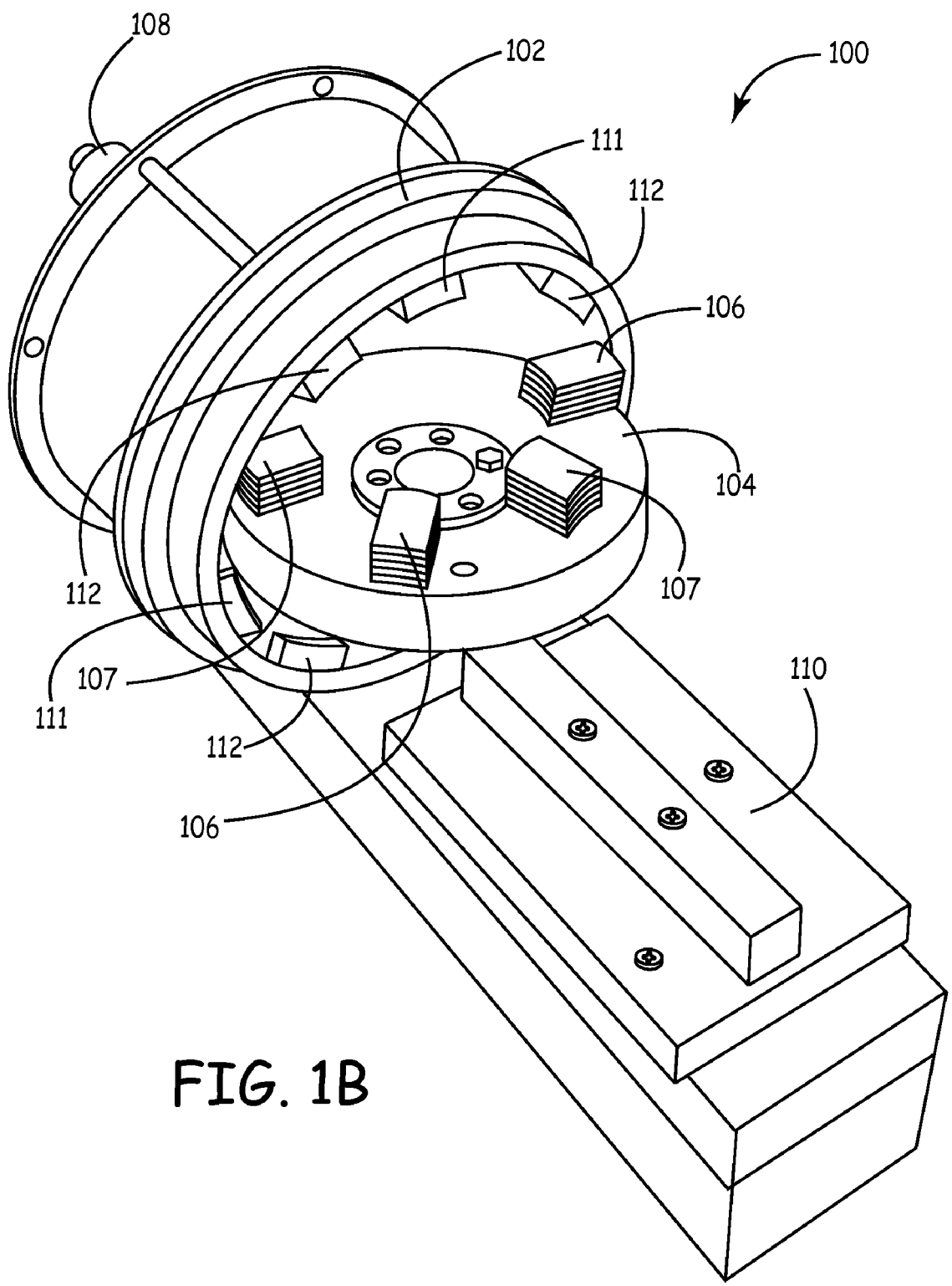
FIG. 1B is a front perspective view of the device of FIG. 1A.

Referring to FIGS. 1A and 1B, an example embodiment of a wheel device 100 is illustrated. As FIG. 1 illustrates, a first magnetic wheel 102 has a portion of a second magnetic wheel 104 received inside it. A rotational axis of the first magnetic wheel (along input shaft 108) is generally perpendicular to a rotational axis of the second wheel 104. It will be understood in the art that slight variations in the positioning of the first rotational axis in relation to the second rotational axis could still achieve a desired output to some extent. Therefore the present invention is not limited precisely to the first rotational axis being perpendicular to the second rotational axis. The first wheel 102 in this embodiment is generally cylindrical in shape having a closed end and an open end. A portion of the second wheel 104 is received in the first wheel 102 through the open end. The first magnetic wheel 102 includes magnets 112 and 111 that are near an outer parameter proximate the open end of the first wheel 102 as illustrated in the front perspective view of FIG. 1B. Further in this embodiment, magnets 104, 106, 120 and 122 are placed proximate the outer perimeter of the second magnetic wheel 104. In this embodiment, magnet 106 is positioned to create a different polarity field than the polarity of the magnetic field created by magnet 104. Likewise, magnet 122 produces a magnetic field with a different polarity than the magnetic field produced by magnet 120. Hence, in this embodiment, alternating magnetic polarity fields are created by the magnets 104, 106, 120 and 122. In this embodiment, magnets 111 and 112 on the first wheel 102 are positioned in a plane that is generally perpendicular to a plane formed by magnets 106 and 107 on the second wheel 104. As further illustrated, the input shaft 108 is coupled to rotate with wheel 102 in FIGS. 1A and 1B.

In an example embodiment, when the first magnetic wheel is rotated 102, the second wheel 104 rotates in response to the magnetic fields produced by the magnets 111, 112, 104, 106, 120 and 122. The number of magnets 111, 112, 104, 106, 120 and 122 used, the strength of the magnetic fields produced by the magnets 111, 112, 104, 106, 120 and 122, the orientation of the magnets 111, 112, 104, 106, 120 and 122, the distance between magnets 111, 112 104, 106, 120 and 122 are selected to achieve a desired output rotation of the second magnetic wheel 104. Hence, a desired rotational output of the second magnetic wheel 104 can be achieved. For example, in one embodiment, twelve magnets poles (alternating between north ((plus)) and south ((minus))) are used in the first wheel 102 and 6 magnet poles (also alternating between north and south) are used on the second wheel 104 with the magnets 106 and 107. As a result, in one embodiment, a 2 to 1 revolution ratio is achieved. That is, in this example embodiment, the second wheel 104 will rotate 2 times for every one time the first wheel 102 rotates. Any type of magnet can be used that produces the desired magnetic field including, but not limited to, Neodymium-Iron-Boron, Ceramic, Aluminum-Nickel-Cobalt, Samarium Cobalt and electromagnets.

Figure 2:
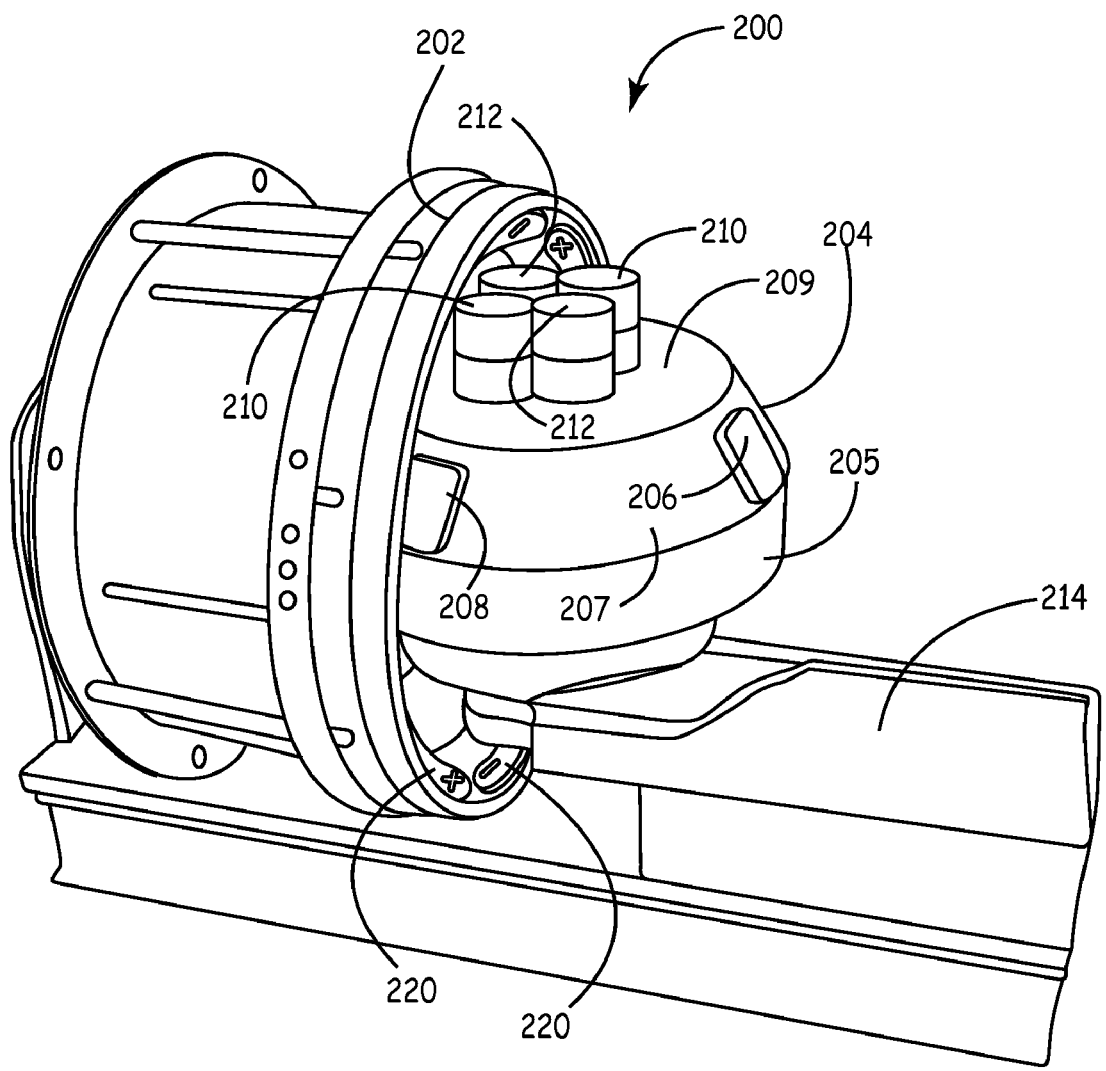
FIG. 2 is a side view of another device of an embodiment of the present invention.
Figure 3:
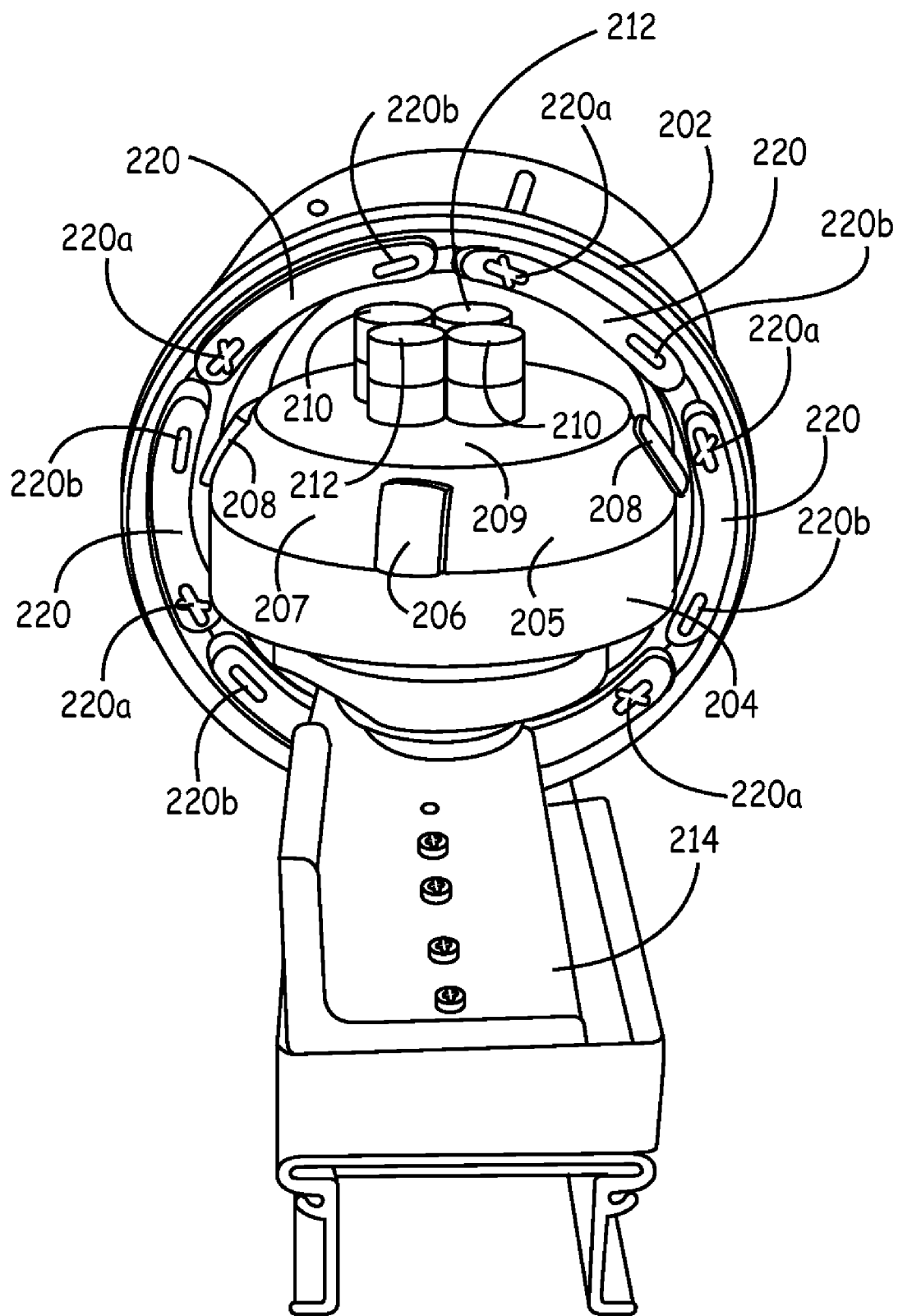
FIG. 3 is a front perspective view of the device of FIG. 2.

FIGS. 2 and 3, further illustrated another embodiment of a device 200. In particular, FIG. 2 illustrates a side perspective view of device 200 and FIG. 3 illustrated a front perspective view of device 200. Similar to the device 100 illustrated and discussed above in regards to FIGS. 1A and 1B, Device 200 of FIGS. 2 and 3 include wheels 202 and 204. Wheel 202 rotates about an axis that is generally perpendicular to a rotational axis of wheel 204. In this embodiment, the second wheel 204 has an outer perimeter that includes a first surface face 205 that runs generally parallel to the rotational axis of the second wheel 204. The second wheel 204 in this embodiment also includes a third surface face 209 that is generally perpendicular to the rotational axis of the wheel 204. A second surface face 207 extends between the first surface face 205 and the third surface face 209. Since, in this embodiment, the third surface face 209 does not extend all the way out to the outer parameter of the wheel 204, the second surface face 207 tapers in from the first surface face 205 to the third surface face 209 (i.e. the second surface face is conical is shape). In the embodiment of FIGS. 2 and 3, a plurality of alternating polarity magnets 208 and 206 are spaced around the second surface face 207. The magnetic fields produced by magnets 208 and 206 interact with magnetic fields produced by magnets 220 on an outer perimeter of the first wheel 102. Referring to FIG. 3, magnets 220 around the outer perimeter of wheel 102 is illustrated. In this embodiment, magnets 220 are positioned so that they each produce a positive (north) and negative (south) field a select distance from each other. The alternating magnetic fields produced magnets 206 and 208 interact with a north magnetic field 220b produced by one magnet on a first side of the first wheel 202 and a south magnetic field 220a of another magnet 220 on a second side of the first wheel 202.

In the embodiment of FIGS. 2 and 3, magnets 210 and 212 each producing a magnetic field of a select polarity are positioned on the third surface face 209 of the second wheel 204. In this embodiment, they are placed near the rotational axis of the second wheel 204. The magnetic fields of these magnets 210 and 212 interact with the magnetic fields produced by magnets 220 on the first wheel 202. In the example embodiment of FIGS. 2 and 3, magnets 212 and 210 on third surface face 209 of the second wheel 204 producing four alternating magnetic fields. Further, six magnets 220 coupled to the first wheel 202 produce twelve alternating magnetic fields that interact with the four alternating magnetic fields from the 4 magnets on the third surface 209 of the second wheel. This will produce a 3:1 revolution ratio. That is, for every one turn of the first wheel 202, the second wheel 204 will turn 3 times. The revolution ratio can be changed by changing the number of magnetic fields produced by the first wheel 202 or the second wheel 204. For example, if the number of different polarity fields produced by magnets of the first wheel 202 was twelve and the number of different polarity fields produced by the magnets on the second wheel 204 was six, the ratio would be 2:1. If there was an equal number of different polarity fields produced by the first wheel 202 and the second wheel (such as twelve and twelve) the ratio would be 1:1. Hence different ratios can be achieved by creating different numbers of alternating magnetic fields on the first and second wheels 202 and 204.

Figure 4:
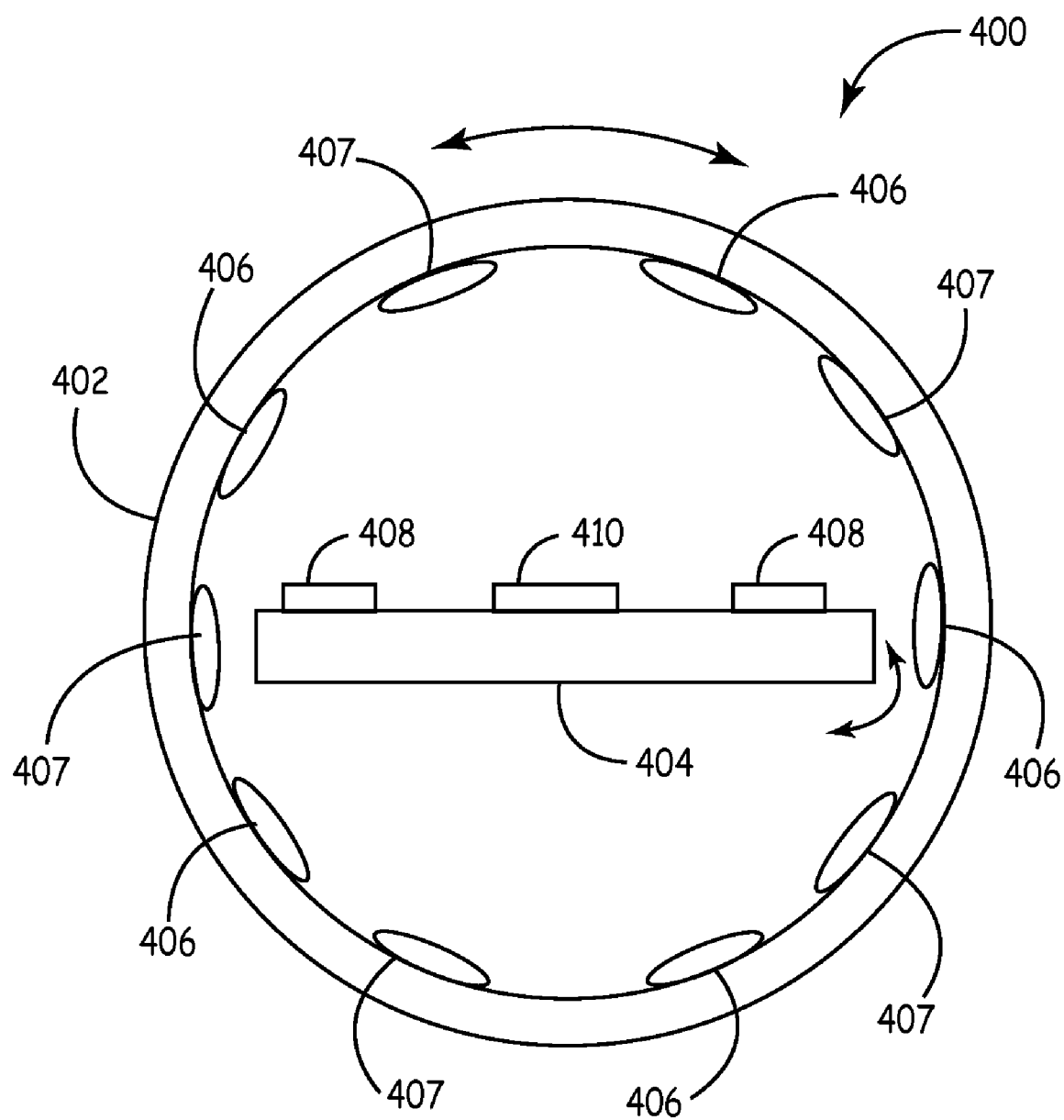
FIG. 4 is front view of a device of one embodiment of the present invention.

Referring to FIG. 4, a front view of a first magnetic wheel 402 having a second magnetic wheel 404 received therein in one embodiment is illustrated. FIG. 4 illustrates a plurality of magnets 406 and 407 on the first magnetic wheel 402 and a plurality of magnets 408 and 410 on the second magnetic wheel 404. This Figure also illustrates the perpendicular arrangement of the first and second magnetic wheels 402 and 404. In an embodiment, magnets 406 on the first wheel 402 produce magnetic fields that are opposite to magnetic fields produced by magnets 407 on the first wheel 402. Similarly, in an embodiment, magnets 408 on the second wheel 404 produce magnetic fields that are opposite to the magnetic fields produced by magnets 410 on the second wheel 404.

Figure 5:
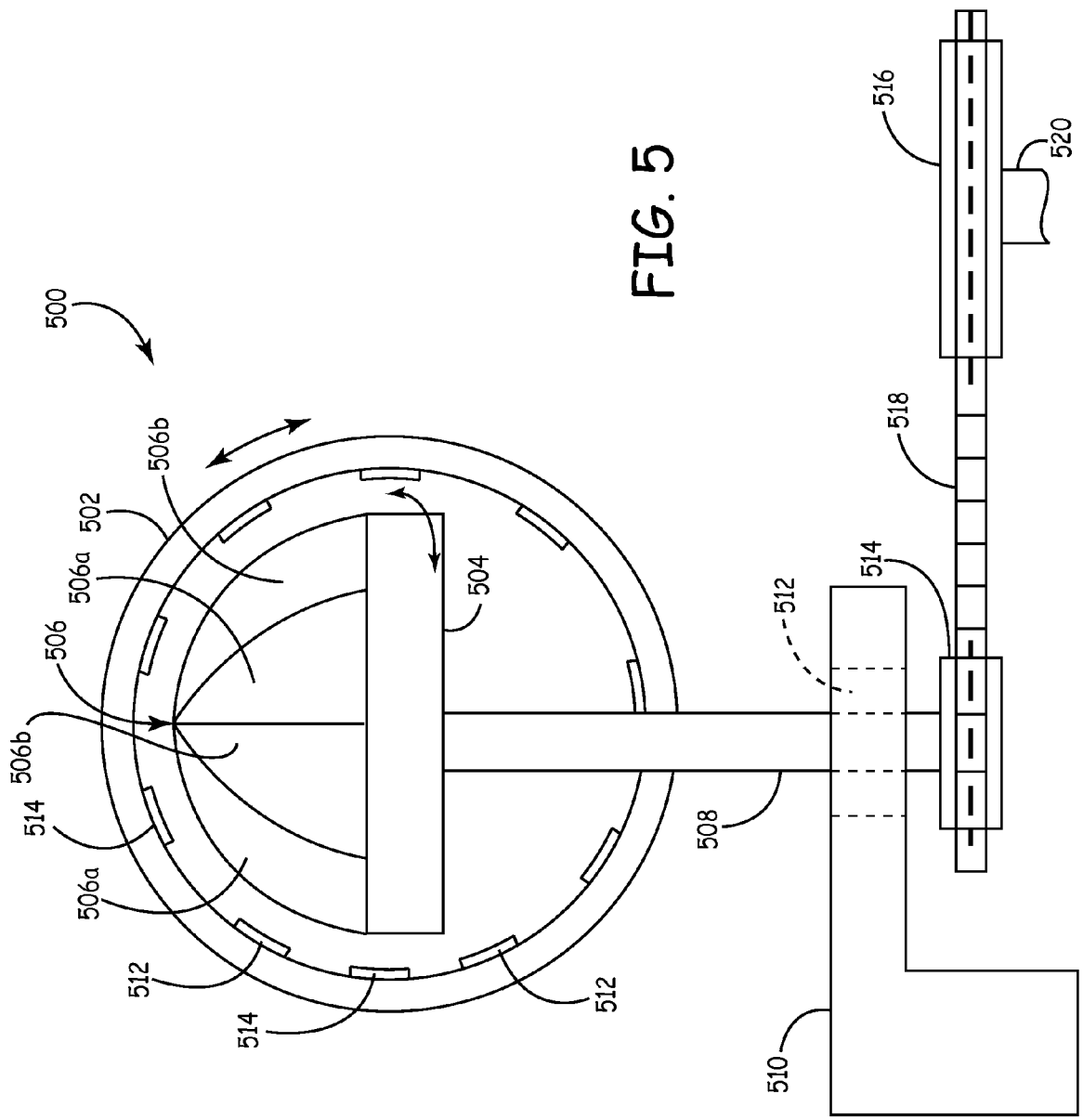
FIG. 5 is a front view of yet another embodiment of the present invention.

FIG. 5 illustrates, yet another embodiment. In FIG. 5, a first wheel 502 that rotates as indicated has a second wheel 504 that is positioned at least partially in the first wheel 502. The first wheel 502 includes a plurality of magnets 512 and 514 that produce alternating polarity magnetic fields. The second wheel 504 has generally a dome shaped portion 506 that consists of alternating pie shaped magnets 506a and 506b that produce alternating polarity magnetic fields. Also illustrated in FIG. 5 is a shaft 508 that is coupled to the second wheel 504 about the second wheels 504 rotational axis. A support 510 including a bearing 512 holds the shaft 508 and the second wheel 504 in a desired location. Proximate an end of shaft 508 is a gear 514 that is engaged with a chain, or the like, to transfer or receive rotational motion via gear 516 and shaft 520. Although, the first wheel 502 is generally illustrated as a ring, in one embodiment, the first wheel 502 is in the shape that conforms at least in part to the shape of a second wheel such as the dome shape portion 506 of the second wheel 504.

Figure 6:
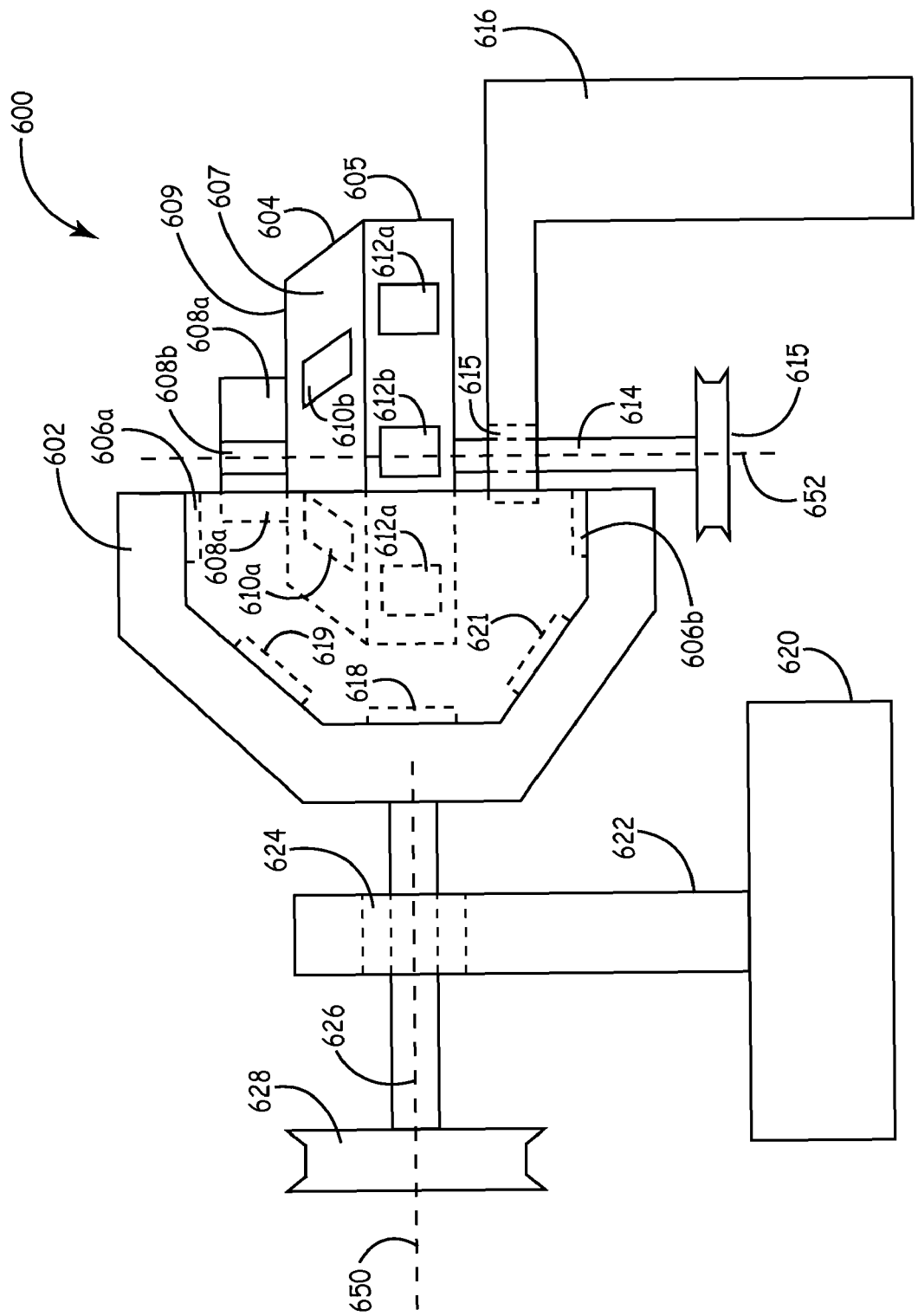
FIG. 6 is a side view of yet another embodiment of the present invention.

FIG. 6 further illustrates yet another embodiment. The first wheel 602 in this embodiment has a shape that generally conforms to surface faces 605, 607 and 609 of the second wheel 604. This allows for the use of more magnets 681, 619 and 621 to produce more magnetic fields in the first wheel 602 to interact with the magnetic fields produced by magnets 612a, 612b, 610a and 610b of the second wheel 604 which results in a stronger force. Magnetic fields produced by magnets 606a and 606b also interact with magnetic fields produced by magnets 608a and 608b similar to the discussion provided above in regards to the embodiment of FIGS. 2 and 3. As illustrated, in FIG. 6, the first wheel 602 rotates about a rotational axis 650 about input shaft 626. Input shaft is held in place by supports 620 and 622. A bearing 624 is positioned around a passage in which the input shaft 624 passes through support 622. Proximate an end of the input shaft 626 is a pulley 628. The pulley 628 can be rotationally engaged to rotate first wheel 602.

The rotational axis 652 of the second wheel 604 in FIG. 6 is about output shaft 614. Output shaft 614 is coupled to second wheel 604 and passes through support 616 which holds the second wheel 604 in place. A bearing 615 is received in the passage through support 616. Proximate the end of the shaft 614 is an output pulley 615. The output pulley 615 can be used to provide rotational movement from the second wheel 604. Although examples above illustrate the use of pulleys 615 and gears 514 any type of input or output arrangement known in the art could be used.

Figure 7:
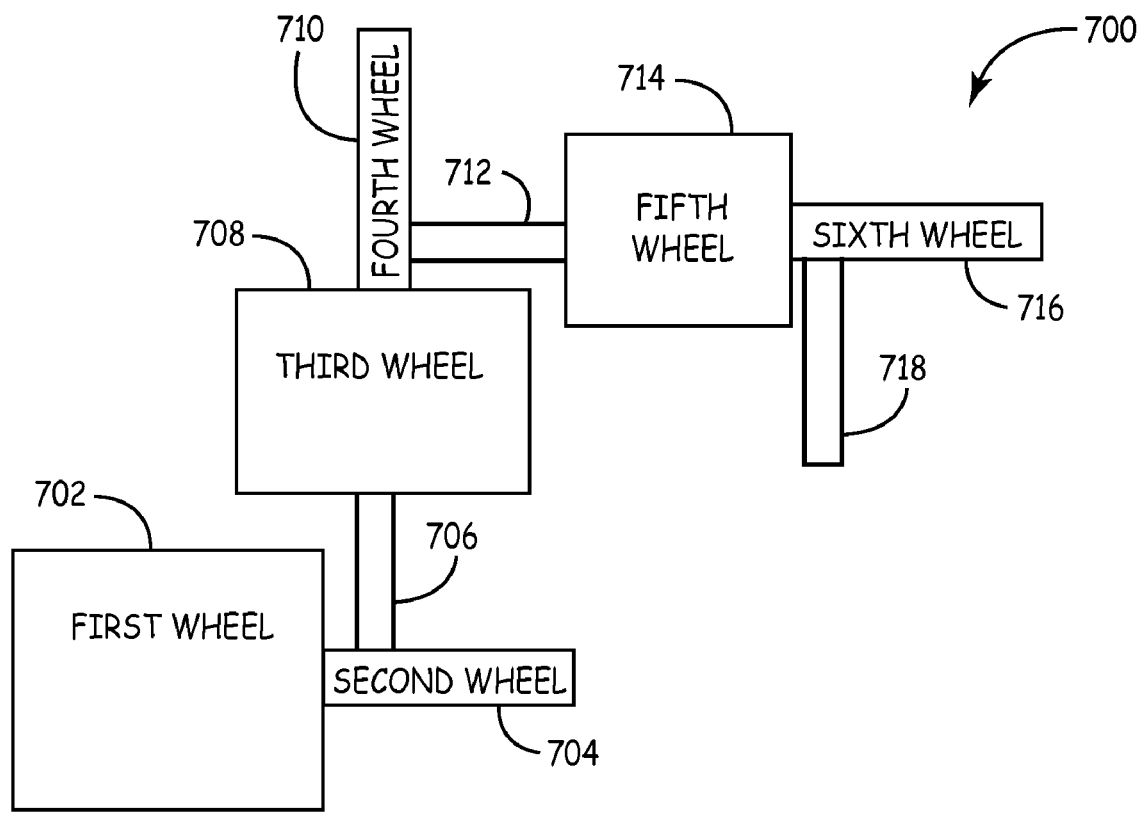
FIG. 7 is a block diagram of an arrangement of a system of devices of one embodiment of the present invention.

FIG. 7 illustrates a further embodiment of the arrangement of magnetic wheels 700. As this embodiment illustrates, the present invention is not limited to just two wheels. In particular, FIG. 7 illustrates a second magnetic wheel 704 inside a first magnetic wheel 702. Drive shaft 706 is connected between the second magnetic wheel 704 and a third magnetic wheel 708. Drive shaft 706 provides rotation movement to the third magnetic wheel 708 in response to the rotation of the second magnetic wheel 704. A fourth magnetic wheel 710 is received within the third magnetic wheel 708. Drive shaft 712 is connected between the fourth magnetic wheel 710 and a fifth magnetic wheel 714. Drive shaft 712 provides rotation movement to the fifth magnetic wheel 714 in response to the rotation of the fourth magnetic wheel 710. A sixth magnetic wheel 716 is further received within the fifth magnetic wheel 716. Drive shaft 718 is coupled to the sixth magnetic wheel 716 to provide a rotational output. The sizes of the first, second, third, fourth, fifth and sixth magnetic wheels 502, 504, 508, 510, 514 and 516 may be varied to achieve desired rotational outputs. Hence, multiple configurations of magnetic wheels can be used to achieve a desired rotation output. Accordingly, embodiments of the present invention can provide a desired rotational output based on the number and the dimensional characteristics of the magnetic wheels as well as the number of magnets used in each wheel, the strength of the magnets used and the orientation of the magnets. Hence, embodiments can be used to function as a transmission gearing up or down as needed. Since, the gearing in the present invention is done without the physical mating of gears, efficiency and longevity over traditional gearing systems is achieved.

Figure 8:
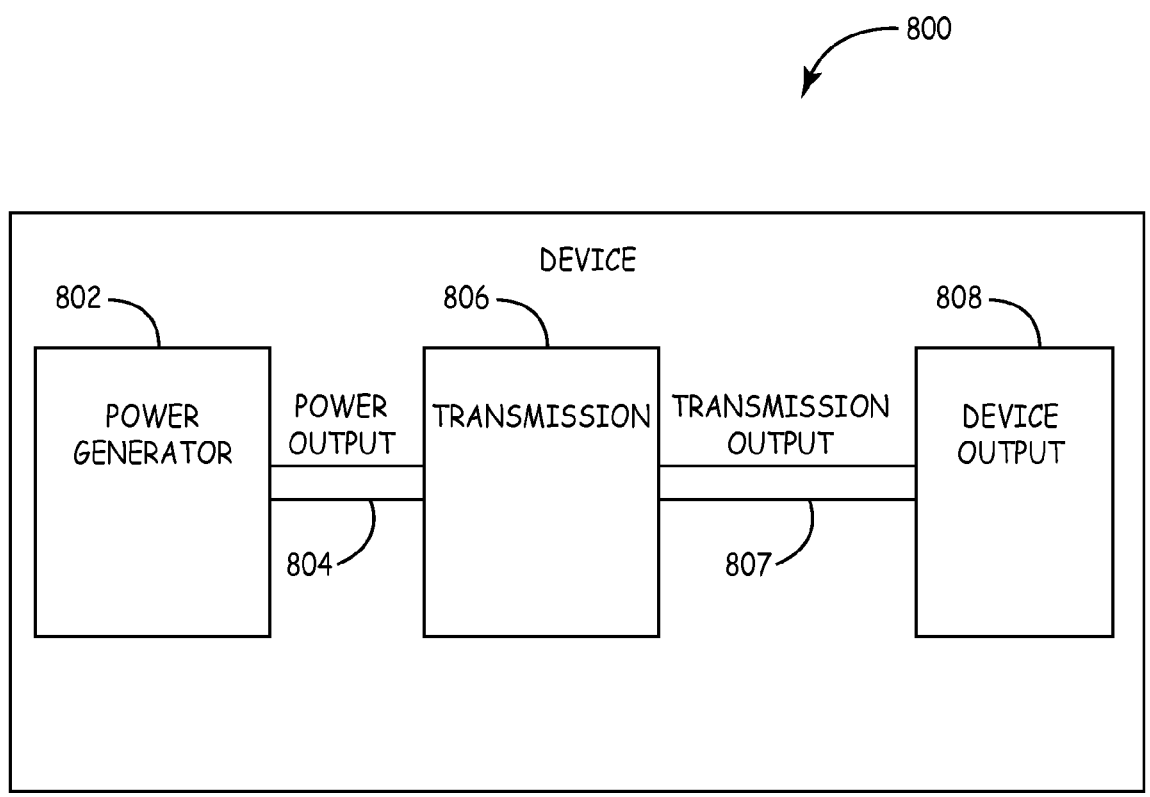
FIG. 8 is a implementation device in an apparatus of one embodiment of the present invention.

Referring to FIG. 8 a block diagram of a device assembly 800 of the present invention is illustrated. The device assembly 800 of FIG. 8 includes a power generator 802 that produces a power output 804 that is coupled to a transmission 806. The transmission 806 is one of the configurations of magnetic wheels as set out above. An output to the transmission 807 is coupled to the device output 808. An example of the device could be any type of vehicle, such as but not limited to, a car truck, boat, plane, ATV, snowmobile or any type of device that generates movement. The transmission 806 of the present invention provides power to an output of a device 808 that is not directly linked (physically linked) to the power generator 802. Hence, one benefit of the device is if the output is violently stopped, the result of the ceasing of movement of the output is not conveyed back to the power generator 802 where it could cause serious damage. For example, if the device assembly 800 was a lawn mower, and the transmission 806 was used to power the lawnmower blade, if the blade inadvertently strikes a rock, the magnetic field generating the motion of the transmission will simply be temporarily broken. However, since the power generator 802 is not directly connected to the output 808 no harm will occur to it or the transmission 806. Hence, embodiments not only provide benefits of reducing wear of parts and efficiency, they also provide a slip transmission that reduces the chance of breakdown of the device.

Figure 9:
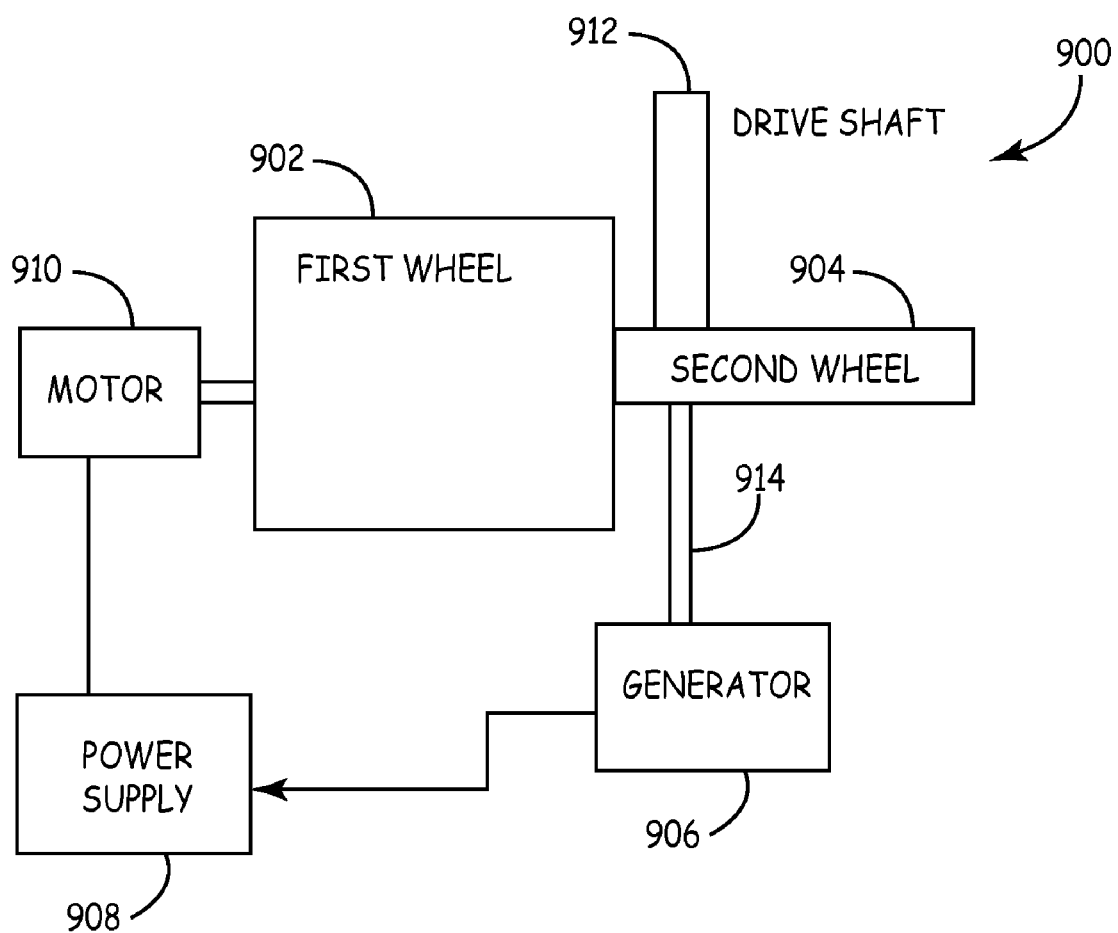
FIG. 9 is a block diagram of another embodiment of the present invention.

FIG. 9, further illustrates another block diagram of device 900 of an embodiment. This embodiment includes a motor 910 that provides rotation motion to a first wheel 902. In response to the rotation of the first wheel 902, the second wheel 904 rotates according to embodiments as set out above. The second wheel 904 has a drive shaft coupled about its rotation of axis to provide a rotational output. A power generating shaft 914 is also coupled about the second wheels rotation axis in an opposite side of the second wheel 904. This power generating shaft 914 provides rotational movement to a generator 906. The generator 906 in response provides energy to the power supply 908 to at least, in part, charge the power supply. The power supply 908 in turn powers the motor 910. Hence, in this embodiment, the output of one of the magnetic wheels 904 is used to supply at least part of the energy to the motor 910 to increase efficiency.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A magnetic device comprising:
    a first wheel having a first rotational axis, the first wheel further having a plurality of first magnets; and
    a second wheel received at least in part within the first wheel, the second wheel having a second rotational axis that is generally perpendicular to the first rotational axis of the first wheel, the second magnetic wheel having a plurality of second magnets, the configuration of the plurality of first magnets and the plurality of second magnets creating magnetic fields that cause one of the first and second wheels to rotate when the other of the first and second wheels rotate;
    wherein the plurality of second magnets are located on a first surface face of the second wheel that forms a plane that is generally perpendicular to the rotational axis of the second wheel; and
    wherein the second wheel has a second surface face that is cylindrical in shape extending parallel to the rotational axis of the second wheel, a plurality of fourth magnets coupled to the second surface face.

2. The magnetic device of claim 1, wherein the plurality of first magnets of the first wheel are configured to create alternating polarity magnetic fields.

3. The magnetic device of claim 2, wherein the plurality of second magnets of the second wheel are configured to create alternating polarity magnetic fields that interact with the alternating polarity magnetic fields created by the first magnets of the first wheel.

4. The magnetic device of claim 1, further comprising:
    the first wheel having an outer perimeter, the plurality of first magnets spaced proximate the outer perimeter.

5. The magnetic device of claim 4, further comprising:
    a third plurality of magnets coupled within the first wheel.

6. The magnetic device of claim 1, wherein the plurality of the second magnets are positioned approximate the rotational axis of the second wheel on the first surface face.

7. The magnetic device of claim 1, wherein the plurality of the second magnets are positioned approximate an outer perimeter of the first surface of the second wheel.

8. The magnetic device of claim 1, wherein the second wheel has at least one third surface face extending between the first surface and the second surface face, a plurality of fifth magnets coupled to the at least one third surface face.

9. The magnetic device of claim 1, wherein the second wheel is at least partially dome shaped.

10. The magnetic device of claim 1, wherein the first wheel has an interior shape that at least in part conforms to at least a portion of the second wheel.

11. A magnetic transmission comprising:
a first wheel configured to rotate about a first rotational axis, the first wheel having a chamber and an opening to the chamber;
a first set of magnets positioned around the opening to the chamber of the first wheel in a configuration that generates alternating polarity magnetic fields about a circumference of the opening;
a second wheel configured to rotate about a second rotational axis, the second wheel at least partially received in the opening to the chamber of the first wheel;
a second set of magnets coupled to the second wheel, the second set of magnets being positioned to form alternating polarity magnetic fields that interact with the alternating polarity magnetic fields of the first wheel when the first wheel is rotating;
a third set of magnets coupled in the chamber of the first wheel; and
a fourth set of magnets coupled to the second wheel to create magnetic fields that interact with the magnetic fields created by the third set of magnets of the first wheel.

12. The magnetic transmission of claim 11, wherein the first rotational axis is generally perpendicular to the second rotational axis.

13. The magnetic transmission of claim 11, wherein at least one of the number of magnets in the first set of magnets and the second set of magnets are selected to achieve a rotational ratio between the first and second wheels.

14. An apparatus implementing a magnetic device, the apparatus comprising:

a power generator configured to generate a rotational power output;
a magnetic transmission, the magnetic transmission including,
at least one first wheel configured to rotate about a first rotational axis in response to the rotational power output of the power generator, the first wheel having an opening,
a first set of magnets positioned around the opening of each first wheel in a configuration that generates alternating polarity magnetic fields about a circumference of the opening,
at least one second wheel configured to rotate about a second rotational axis that is generally perpendicular to the first rotational axis of the at least one first wheel, the at least one second wheel at least partially received in the opening of the at least one first wheel,
a second set of magnets for each second wheel, the second set of magnets being positioned to form alternating polarity magnetic fields that interact with the alternating polarity magnetic fields of the at least one first wheel when the at least one first wheel is rotated by the power generator output
a third set of magnets coupled to the first wheel,
a fourth set of magnets coupled to the second wheel to create magnetic fields that interact with the magnetic fields created by the third set of magnets of the first wheel; and
a device output configured to implement a rotational transmission output from the at least one second wheel.

15. The apparatus of claim 14, the power generator further comprises:
a motor;
a power supply; and
a generator, an output of the transmission configured to supply at least some energy to the generator to charge the power supply.

16. The apparatus of claim 14, wherein the at least one first wheel and the at least one second wheel is a plurality of sets of first and second wheels.

17. The apparatus of claim 1, wherein the number of magnetic fields created by the first and second magnets can be changed to change the rotational ratio between the at least one first wheel and the at least one second wheel.

* * * * *